(No Model.)
J. D. BARRIE.
PARALLEL RULER.
No. 577,708.　　　　　　　　　　Patented Feb. 23, 1897.
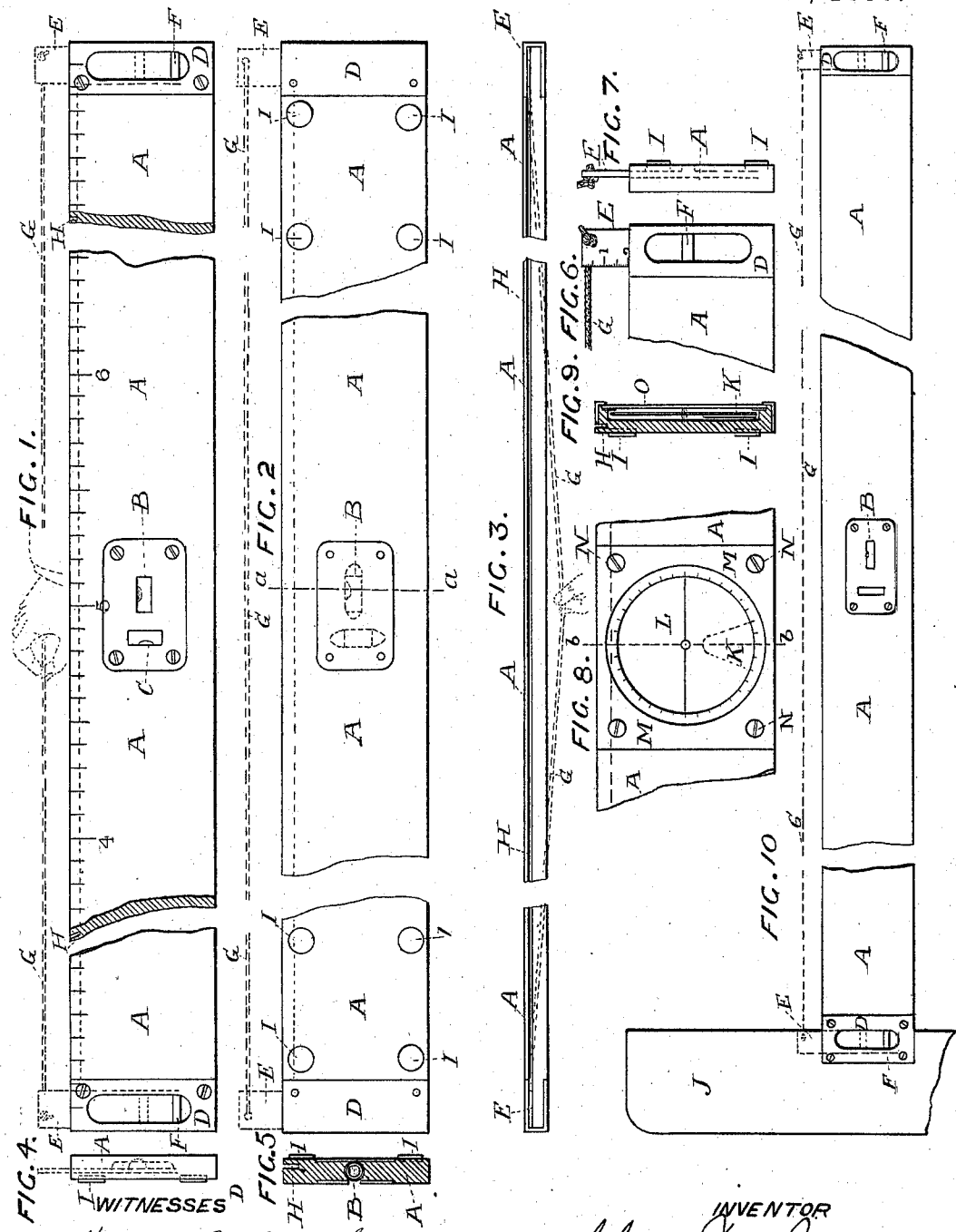
WITNESSES
Harry A. Brooks
Greely W. Bently
INVENTOR
John D. Barrie
BY
St. John Day.
ATTORNEY

UNITED STATES PATENT OFFICE.

JOHN D. BARRIE, OF LOS ANGELES, CALIFORNIA, ASSIGNOR OF ONE-FOURTH TO JAMES J. McINERNEY, OF SAME PLACE.

PARALLEL-RULER.

SPECIFICATION forming part of Letters Patent No. 577,708, dated February 23, 1897.

Application filed August 23, 1895. Serial No. 560,225. (No model.)

*To all whom it may concern:*

Be it known that I, JOHN D. BARRIE, a citizen of the United States, residing in the city and county of Los Angeles and State of California, have invented certain new and useful Improvements in Rulers, of which the following is a full, clear, and exact description or specification, reference being had to the accompanying sheet of drawings, and the letters marked thereon, which form part of the said specification.

My invention relates to improvements in rulers such as are used in public schools, class-rooms, and other places or institutions where it is required to rule straight lines upon drawing-boards, blackboards, or upon the walls of a building, so as to be seen from a distance.

The object of my invention is to enable such rulers for such purposes to be immediately adjusted to the position required, so that all the horizontal lines will be level and all the vertical lines truly perpendicular to the horizontal lines, the true position of the ruler in every case being ascertained by means of one or more levels combined therewith.

My invention has also for its object to enable such ruler to be steadily maintained in position against the surface of a drawing-board, blackboard, or a wall by means of elastic pads, such, for example, as pads of soft caoutchouc fixed in or upon the rear face of the ruler, so that when the ruler is placed against the surface upon which lines are to be ruled the soft elastic pads are in contact therewith and by means of the pressure of the hand upon the outer side of the ruler are sufficient to maintain the ruler in the position requisite for the necessary lines to be drawn.

My invention has also for its object to employ an elastic cord to be used in combination with such ruler, which cord, by being chalked or otherwise coated or charged with a colored material and being drawn back at the center by the tension of the thumb and finger of the user, by reason of its own elasticity returns to the surface upon which the lines are to be ruled, and thereby marks the necessary line or lines thereon. This cord is attached to two sliding pieces, one at each end of the ruler. Each sliding piece is marked with divisions thereon, so as to indicate the height to which the cord is raised above the upper surface of the ruler, and this distance can be varied from time to time as required, the divisional markings upon the slides indicating the distance and parallelism of the cord. The cord is attached to the said slides by means of a knot at each end, or it may be otherwise conveniently attached thereto. The levels which are used in connection with my improved ruler may be spirit-levels of the ordinary construction, or in place thereof a pendulum-level may be used, the particular kind of level employed forming or constituting no part of my present improvements.

It is here explained that my improvements are applicable either to an ordinary straight ruler or to a ruler of the kind commonly known as a "T-square." In order to maintain the marking-cords when not in use from being injured by external contact with any objects, the upper surface of the ruler along which it is stretched is or may be formed with a groove therein colinear with the sliding pieces to which the cord is attached, or in place of a groove the upper part of the ruler may have a rabbet or curved equivalent recess formed therein to receive the cord when shut down to its lowest position, which last arrangement has the advantage of enabling the slides to which the marking-cord is attached, and therefore the entire length of the marking-cord, to be brought as near as possible to the surface upon which the ruling is to be made.

A further feature of my improvement consists in forming in one side or edge of the ruler and in the head of a ruler of the kind commonly known as a "T-square" an angular groove, the faces of which are coated with sandpaper, emery powder, or other suitable abrading material. The object of this feature of my invention is to have always at hand, when ruling operations are being performed, a means whereby to sharpen or put a fine point on the end of a pencil, piece of chalk, charcoal, or other marking substance being used without moving or withdrawing the ruler or T-square or the hand sustaining the same from the blackboard or other surface upon which lines are being ruled.

On the annexed sheet of drawings, Figure 1 is a front elevation of a ruler constructed according to my improvements. Fig. 2 is an elevation of the rear side of the same. Fig. 3 is a plan showing the top of the ruler. Fig. 4 is an end view of the ruler. Fig. 5 is a transverse section of the same on line $a\ a$, Fig. 2. Fig. 6 is an elevation of one end of the ruler, showing the measuring-divisions upon the slide. Fig. 7 is an end elevation corresponding to Fig. 6. Fig. 8 is a front elevation of the center part of my improved ruler with a plumb-bob level applied thereto in place of the spirit-level shown in Figs. 1 to 5. Fig. 9 is a transverse section on the line $b\ b$, Fig. 8. Fig. 10 is a front elevation of a T-square ruler, showing my improvements applied thereto.

In Figs. 1, 2, 3, 4, 5, 6, and 7 the body of the ruler is marked A. Such ruler is usually constructed of the length of a French meter and divided along its upper side into decimeters and centimeters, such as are shown in Fig. 1. At or near the central part of the ruler there is inserted a horizontal spirit-level B, which, when the ruler is applied to the surface upon which lines are to be drawn, shows its bubble in the center position when the said ruler is placed truly horizontal, and when at right angles thereto the vertical level C, when the said ruler is placed in a vertical position, shows its bubble in the center position, therefore insuring that the ruler is truly perpendicular.

Each end of the said ruler is fitted with a metallic mounting D, into which, near or close to the rear side thereof, there is fitted a sliding bar E. (Shown in dotted lines in Figs. 1, 2, and 4.) At the front face of the brass mounting D a vertical opening is formed, as shown more particularly at Figs. 1 and 6, and into this opening there projects the thumb-piece F, by applying the thumb to which, and forcing upward, the sliding pieces E are moved out from the upper surface of the ruler, as shown in the dotted lines at Figs. 1 and 2 and in full lines at Figs. 6 and 7. To these sliding pieces E the marking-cord G is attached by knots or in any suitable manner so that the rearward edge or face of the marking-cord comes as near as possible to the surface against which the ruler is applied for the purpose of making lines, as shown in Figs. 1, 2, 3, 4, 6, and 7. When the sliding pieces E are raised to any desired height above the edge of the ruler, they also raise the cord G with them out from the groove H, and the cord, being charged with chalk or any other marking material, is pulled outward by the hand (shown in dotted lines in Figs. 1 and 3) and suddenly let go, when the reaction due to the elasticity causes the cord to so strike against the drawing-board, blackboard, or other surface as to make the necessary line or lines thereon. After such cord has been so used it may again be shut down into the groove H.

At the rear side of the ruler there are shown the contact-pieces I, of soft caoutchouc or other suitable elastic material, which, when the ruler is placed against the surface upon which lines are to be ruled, helps to maintain it steadily in position thereon by reason of the stability brought about by reason of the elastic surface contact. These contact-pieces are preferably placed at the ends of the ruler only, but it is to be understood that they may be placed in any other part thereof.

As the only difference between the ruler hereinbefore described with reference to Figs. 1 to 7 relatively with that shown at Fig. 10 consists in that shown at Fig. 10 being applied to a T-square ruler, any description of the parts hereinbefore relating to Figs. 1 to 7 may be read as constituting a description of Fig. 10, with the exception of the T-head J, which is of the ordinary fixed or movable construction, and therefore no further description thereof is here necessary.

Although I have in the preceding parts of this specification and in the accompanying sheet of drawings shown the marking-cord G as applied to the upper part of a ruler or edge, it is also to be understood that it may be applied with equal advantage and feasibility to the lower edge thereof, and although I have also in the foregoing parts of this specification described spirit-levels as being combined in my said ruler for the purpose of indicating the true horizontal or vertical position thereof, yet I desire here to explain that a spirit-level is not absolutely essential for such purpose, but it is the most convenient, simple, and least costly that I am at present acquainted with, but in order to illustrate that levels of another kind may be substituted for the spirit-level I have shown upon the annexed sheet of drawings Figs. 8 and 9, which illustrate the application of a plumb-bob level in substitution of the spirit-levels. In these figures the plumb-bob K (shown in dotted lines in Fig. 8) is attached to the card L, which is fitted at the center with a metallic bearing, by which it is carried upon a center pin and pivot. The disk and plumb-bob are let into a recess formed in the outer or front side of the ruler and retained therein by means of a brass or other metallic plate M, which, when fastened to the center of the ruler by means of the screws N, at the same time secures the glass plate O, which effectually covers over the leveling part of the apparatus.

For the purpose of sharpening the pencil, chalk, charcoal, or other marking substance used from time to time, as may be necessary, the under edge of the ruler shown at Figs. 1, 2, 4, and 5 or the head of the ruler J (shown at Fig. 10) is formed with a groove therein whose sides incline at an angle toward each other. These sides are coated with fine sandpaper, emery-cloth, or other equally fine abrading material, and by holding and rubbing the pencil or other marking instrument therein at any desired angle a corresponding and suitable point is at all times quickly formed upon the said pencil or marking instrument.

Having now described the nature of my invention and the best system, mode, or manner I am at present acquainted with for carrying the same into practical effect, I desire to observe, in conclusion, that what I consider to be novel and original and the invention to be secured to me by Letters Patent is as follows:

1. The combination of the ruler, the marking-cord, the sliding device and thumb-piece at each end of the ruler, to which each end of the marking-cord is attached, the groove in the edge of the ruler for receiving and inclosing the marking-cord, the level or levels at the center of the ruler, all operating together in the manner and for the purposes, substantially as set forth.

2. The combination of the ruler, the marking-cord, the sliding device and thumb-piece at each end of the ruler, to which each end of the marking-cord is attached, the groove in the edge of the ruler for receiving and inclosing the marking-cord, the level or levels, the elastic contact-pieces, all operating together in the manner and for the purposes, substantially as set forth.

In testimony whereof I have hereunto set my signature in presence of two subscribing witnesses.

JOHN D. BARRIE.

Witnesses:
H. S. ROLLINS,
ST. JOHN DAY.